United States Patent
Harrington et al.

(10) Patent No.: US 12,026,640 B2
(45) Date of Patent: Jul. 2, 2024

(54) AUTONOMOUS VEHICLE SEAT RESERVATION

(71) Applicant: GM Cruise Holdings LLC, San Francisco, CA (US)

(72) Inventors: Curt Harrington, San Francisco, CA (US); Wei Lu, San Bruno, CA (US); Devina Jain, San Francisco, CA (US); Kunal Mehta, San Francisco, CA (US); Nikola John Linn Noxon, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 401 days.

(21) Appl. No.: 17/180,975

(22) Filed: Feb. 22, 2021

(65) Prior Publication Data

US 2022/0269998 A1   Aug. 25, 2022

(51) Int. Cl.
| | |
|---|---|
| *G06Q 10/02* | (2012.01) |
| *B60W 50/14* | (2020.01) |
| *B60W 60/00* | (2020.01) |
| *G06Q 50/40* | (2024.01) |
| *G05D 1/00* | (2006.01) |

(52) U.S. Cl.
CPC ............ *G06Q 10/02* (2013.01); *B60W 50/14* (2013.01); *B60W 60/00253* (2020.02); *G06Q 50/40* (2024.01); *G05D 1/0088* (2013.01)

(58) Field of Classification Search
None
See application file for complete search history.

(56) References Cited

U.S. PATENT DOCUMENTS

| | | | |
|---|---|---|---|
| 2016/0320195 A1* | 11/2016 | Liu | G01C 21/3438 |
| 2018/0162186 A1* | 6/2018 | Anderson | B60K 35/00 |
| 2018/0211124 A1* | 7/2018 | Rakah | G06Q 10/047 |
| 2018/0218470 A1* | 8/2018 | Belwafa | G06Q 10/02 |

(Continued)

FOREIGN PATENT DOCUMENTS

WO   2022177604 A1   8/2022

OTHER PUBLICATIONS

"International Search Report and Written Opinion for PCT Patent Application No. PCT/US2021/048386", dated Nov. 23, 2021, 11 pages.

(Continued)

*Primary Examiner* — Peter D Nolan
*Assistant Examiner* — Jacob Kent Besteman-Street

(57) ABSTRACT

Various technologies described herein pertain to reserving seats in an autonomous vehicle. The autonomous vehicle includes a plurality of seats that can be occupied by passengers when riding in the autonomous vehicle. The autonomous vehicle is configured to assign a particular seat from the plurality of seats in the autonomous vehicle to a passenger based on information pertaining to the passenger and information pertaining to a ride-sharing trip. The autonomous vehicle is to transport at least the passenger and a differing passenger during at least a portion of the ride-sharing trip. Moreover, the passenger and the differing passenger independently request rides in the autonomous vehicle. The autonomous vehicle is further configured to output, to the passenger, an indication of the particular seat assigned to the passenger.

18 Claims, 7 Drawing Sheets

(56) References Cited

U.S. PATENT DOCUMENTS

| | | | |
|---|---|---|---|
| 2020/0062172 A1 | 2/2020 | Lujan et al. | |
| 2020/0249042 A1* | 8/2020 | Warr | H04W 4/023 |
| 2020/0294173 A1* | 9/2020 | Shah | G06Q 50/30 |
| 2021/0110315 A1* | 4/2021 | Fox | G06Q 30/0282 |
| 2021/0380135 A1* | 12/2021 | Kanitz | G01C 21/3461 |
| 2023/0196213 A1* | 6/2023 | Murakami | G06Q 10/02 |
| | | | 705/5 |

OTHER PUBLICATIONS

Mukhtar, et al., "Mobility Aids Detection Using Convolution Neural Network (CNN)", In 2018 International Conference on Image and Vision Computing New Zealand, Nov. 19, 2018, pp. 1-5.

* cited by examiner

AUTONOMOUS VEHICLE SEAT RESERVATION

BACKGROUND

Recently, ridesharing has become more prevalent in society. A passenger can utilize a website or an application executed on a mobile computing device to request a ride. The request can specify a pickup location, a drop off location, a pickup time, or the like. Responsive to the request, the passenger can be matched with a vehicle to provide the passenger a ride.

Oftentimes, more than one passenger can be provided a ride in the same vehicle for at least a portion of a trip (e.g., more than one passenger can concurrently be provided a ride by the vehicle). Passengers can independently request rides, such that a vehicle can concurrently provide rides to passengers who are not traveling as part of a common group. Passengers typically occupy seats in the vehicle on a first come/first served basis. Thus, a first passenger picked up may sit in a seat of her or his choosing from the available seats of the vehicle. Then, when a second passenger is picked up, the second passenger may sit in one of the other available seats within the vehicle or ask that the first passenger change seats. When the vehicle is operated by a driver, the driver can assist in requesting that passengers occupy particular seats in the vehicle. According to an illustration, if a first passenger enters into the vehicle on the right side of the vehicle, the driver can ask that the first passenger move to the left side of the vehicle to sit in a seat on the left side. Following this illustration, the first passenger can sit on the left side of the vehicle so that a second passenger to be subsequently picked up can enter into the vehicle on the right side of the vehicle (e.g., without the first passenger blocking entry).

More recently, development of autonomous vehicles has started. An autonomous vehicle is a motorized vehicle that can operate without a human driver. An exemplary autonomous vehicle includes a plurality of sensor systems such as, but not limited to, a lidar sensor system, a camera sensor system, and a radar sensor system, amongst others. The autonomous vehicle operates based on sensor signals output by the sensor systems. The autonomous vehicle can be utilized as part of a ride-sharing scenario. The autonomous vehicle can concurrently provide rides to a plurality of passengers. However, due to the lack of a driver in the autonomous vehicle directing passenger(s) to sit in particular seat(s), a seating arrangement of one or more of the passengers may make subsequent pickups and drop offs more difficult.

SUMMARY

The following is a brief summary of subject matter that is described in greater detail herein. This summary is not intended to be limiting as to the scope of the claims.

Described herein are various technologies that pertain to reserving seats in an autonomous vehicle. The autonomous vehicle can include a plurality of seats that can be occupied by passengers when riding in the autonomous vehicle. The autonomous vehicle can be configured to assign a particular seat from the plurality of seats in the autonomous vehicle to a passenger based on information pertaining to the passenger and information pertaining to a ride-sharing trip. The autonomous vehicle is to transport at least the passenger and a differing passenger during at least a portion of the ride-sharing trip. Moreover, the passenger and the differing passenger independently request rides in the autonomous vehicle. The autonomous vehicle is further configured to output, to the passenger, an indication of the particular seat assigned to the passenger.

According to various embodiments, the information pertaining to the passenger can include a seat choice preference explicitly specified by the passenger. For example, the seat choice preference can be retained in a profile of the passenger (e.g., the passenger can explicitly specify the seat choice preference in his or her profile, and the seat choice preference from the profile can be utilized to assign the passenger to particular seat in the autonomous vehicle). According to another example, the seat choice preference can be explicitly specified by the passenger at a time of requesting the ride in the autonomous vehicle. For instance, the passenger can request the ride in the autonomous vehicle using a mobile computing device. The mobile computing device can receive real-time information specifying available seats in the autonomous vehicle. Further, the mobile computing device can be utilized by the passenger to provide an input concerning the seat choice preference (e.g., the passenger can select a particular available seat for the ride in the autonomous vehicle at the time of requesting the ride, prior to entry into the autonomous vehicle). In response to the input, the autonomous vehicle can assign the particular seat specified in the input to the passenger.

Pursuant to various embodiments, the information pertaining to the passenger can include inferred information identified from previous experiences of the passenger riding in autonomous vehicles. For instance, the inferred information can include information concerning previous experiences of the passenger encountering motion sickness when seated in particular seats in autonomous vehicles. According to an illustration, if the passenger has previously experienced motion sickness when seated in a backwards facing seat in an autonomous vehicle, then a profile of the passenger can include inferred information specifying that the passenger is to be assigned to forward facing seats (e.g., since it can be inferred that the passenger is likely to experience motion sickness if seated in a backwards facing seat).

In accordance with various embodiments, the information pertaining to the passenger can additionally or alternatively include inferred information concerning the passenger identified from a current ride of the passenger. According to an illustration, if the passenger has set a hospital or a doctor's office as a destination for the ride, then an inference can be made that the passenger may have more difficulty sitting in a backwards facing seat or a seat that is away from a curb side of the autonomous vehicle. Thus, the autonomous vehicle can assign the particular seat based on the inferred information concerning the passenger identified from the current ride of the passenger.

As noted above, at least the passenger and the differing passenger are transported by the autonomous vehicle during at least a portion of the ride-sharing trip. The information pertaining to the ride-sharing trip can include an order in which passengers are picked up and/or an order in which the passengers are dropped off. Further, the information pertaining to the ride-sharing trip can include a pickup location at which the passenger is to be picked up and/or a drop off location at which the passenger is to be dropped off. Moreover, the information pertaining to the ride-sharing trip can include a pickup location at which the differing passenger is to be picked up and/or a drop off location at which the differing passenger is to be dropped off (as well as any other passenger(s) to be concurrently transported by the autonomous vehicle with the passenger during at least a portion of the ride-sharing trip).

According to various embodiments, the indication of the particular seat assigned to the passenger can be outputted by transmitting the indication of the particular seat assigned to the passenger to a mobile computing device of the passenger. Pursuant to other embodiments, the indication of the particular seat assigned the passenger can be outputted by presenting the indication of the particular seat assigned to the passenger on a display within the autonomous vehicle. For instance, the display within the autonomous vehicle can present the indication of the particular seat assigned to the passenger when the passenger enters the autonomous vehicle.

In accordance with various embodiments, the autonomous vehicle can be configured to reassign the passenger to a differing seat from the plurality seats in the autonomous vehicle subsequent to initiation of transporting of the passenger for the ride-sharing trip with the passenger seated in the particular seat. A differing indication of the differing seat to which the passenger is reassign can be outputted to the passenger. The passenger, for example, can be reassigned to the differing seat based on a side of the autonomous vehicle from which the passenger is to exit the autonomous vehicle. Additionally or alternatively, the passenger can be reassigned to the differing seat based on a side of the autonomous vehicle from which the differing passenger is to enter or exit the autonomous vehicle.

According to various embodiments, a mobile computing device can include a display. The mobile computing device can be configured to transmit an autonomous vehicle ride request for a passenger (e.g., the passenger or a different user can utilize the mobile computing device). Moreover, the mobile computing device can receive an indication of a particular seat from the plurality seats in an autonomous vehicle assigned to the passenger. The autonomous vehicle is to transport at least the passenger and a differing passenger during at least a portion of a ride-sharing trip. Further, the passenger and a differing passenger independently request rides in the autonomous vehicle. The mobile computing device can further cause the display to present the indication of the particular seat from the plurality seats in the autonomous vehicle assigned to passenger. According to various embodiments, the autonomous vehicle can assign the passenger to the particular seat. Moreover, according to various embodiments, the mobile computing device can be configured to receive an indication that the particular seat in the autonomous vehicle is available for the passenger (e.g., real-time seat availability can be received by the mobile computing device). The mobile computing device can further be configured to reserve the particular seat in the autonomous vehicle for the passenger based on input received by the mobile computing device (e.g., from the user of the mobile device, from the passenger utilizing the mobile computing device). The indication that the particular seat in the autonomous vehicle is assigned to the passenger can be received responsive to the particular seat in the autonomous vehicle being reserved for the passenger.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
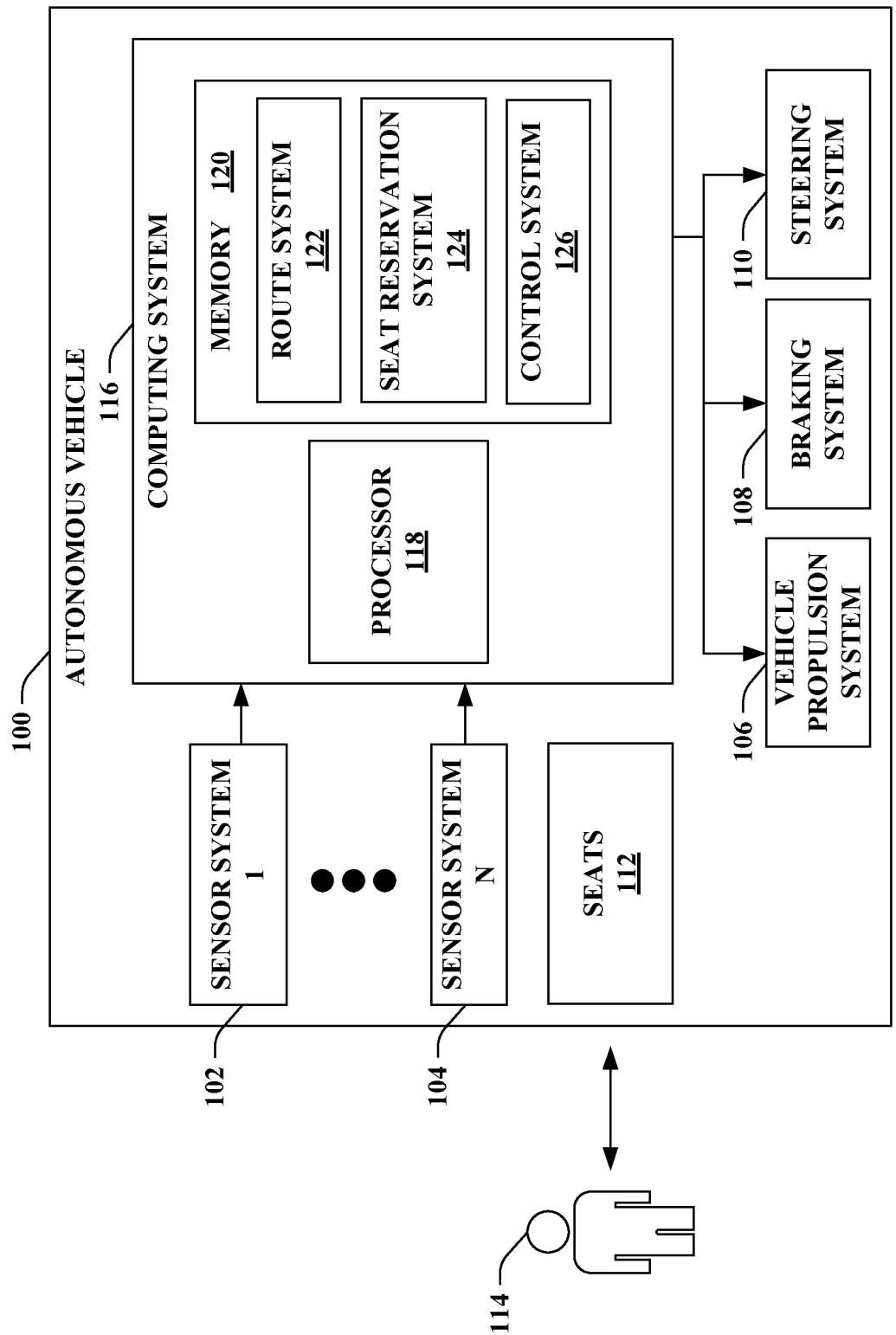
FIG. 1 illustrates a functional block diagram of an exemplary autonomous vehicle.

Various technologies pertaining to reserving a seat for a passenger in an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Referring now to the drawings, FIG. 1 illustrates an exemplary autonomous vehicle 100. The autonomous vehicle 100 can navigate about roadways without human conduction based upon sensor signals outputted by sensor systems of the autonomous vehicle 100. The autonomous vehicle 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the autonomous vehicle 100. For example, the sensor system 1 102 may be a lidar sensor system and the sensor system N 104 may be a camera (image) sensor system. Other exemplary sensor systems included in the sensor systems 102-104 can include a radar sensor system, a GPS sensor system, a sonar sensor system, an infrared sensor system, and the like.

The autonomous vehicle 100 further includes several mechanical systems that are used to effectuate appropriate motion of the autonomous vehicle 100. For instance, the mechanical systems can include, but are not limited to, a vehicle propulsion system 106, a braking system 108, and a steering system 110. The vehicle propulsion system 106 may be an electric engine or a combustion engine. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 also includes a plurality of seats 112. Passengers (e.g., a passenger 114, differing passenger(s)) transported by the autonomous vehicle 100 respectively sit in the seats 112 of the autonomous vehicle 100. It is to be appreciated that substantially any number of seats 112 can be included in the autonomous vehicle 100. Moreover, the seats 112 can be positioned and oriented relative to each other in substantially any manner. Further, it is to be appreciated that differing autonomous vehicles can include differing numbers and/or configurations of seats.

According to an example, the autonomous vehicle 100 can include four seats 112. In accordance with an illustration, the four seats can include two rows of two seats. The four seats may all be forwards facing seats in some embodiments (e.g., passengers seated in each of the forwards facing seats face the front of the autonomous vehicle 100 and are oriented in a direction of travel of the autonomous vehicle 100). In other embodiments, the four seats can include two forwards facing seats and two backwards facing seats (e.g., passengers seated in the backwards facing seats face the rear of the autonomous vehicle 100 and are oriented in a direction opposite the direction of travel of the autonomous vehicle 100).

According to another example, the autonomous vehicle 100 can include six seats 112. Pursuant to an illustration, the autonomous vehicle 100 can include two rows of three seats. According to another illustration, the autonomous vehicle 100 can include three rows of two seats. Again, it is to be appreciated that the six seats can all be forwards facing seats or the six seats can include forwards facing seats and backwards facing seats (e.g., one of the rows of seats can include backwards facing seats).

The claimed subject matter, however, is not limited to the foregoing examples describing the seats 112. It is to be appreciated that substantially any number of seats 112, positions of the seats 112 relative to each other, and/or orientations of the seats 112 relative to each other are intended to fall within the scope of the hereto appended claims.

The autonomous vehicle 100 additionally includes a computing system 116 that is in communication with the sensor systems 102-104, the vehicle propulsion system 106, the braking system 108, and the steering system 110. The computing system 116 includes a processor 118 and memory 120; the memory 120 includes computer-executable instructions that are executed by the processor 118. Pursuant to various examples, the processor 118 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 120 can include a route system 122 configured to control routing of the autonomous vehicle 100 in an environment. For instance, the route system 122 can control routing of the autonomous vehicle 100 to a pickup location of a passenger 114. The route system 122 can also control routing of the autonomous vehicle 100 from the pickup location of the passenger 114 to a drop off location of the passenger 114. The route system 122, for example, can plan the route for the autonomous vehicle 100 responsive to a dispatch system assigning a ride for a particular passenger (e.g., the passenger 114, a differing passenger) to the autonomous vehicle 100. Moreover, the route system 122 can update the route for the autonomous vehicle 100 over time (e.g., based on current traffic conditions, weather conditions, differing passenger(s) to be picked up or dropped off, etc.). It is contemplated that the route system 122 can generate a route that picks up and drops off a plurality of passengers from various pickup locations and drop off locations (e.g., the route can pick up and drop off the passengers in substantially any order).

The autonomous vehicle 100 is to transport at least the passenger 114 and a differing passenger during at least a portion of a ride-sharing trip as controlled by the route system 122. The passenger 114 and the differing passenger independently request rides in the autonomous vehicle 100 (e.g., the passenger 114 and the differing passenger separately hail a ride in an autonomous vehicle, the passenger 114 and the differing passenger are not traveling as part of a common group, the rides of the passenger 114 and the differing passenger are separately assigned to the autonomous vehicle 100 by the dispatch system responsive to separate autonomous vehicle ride requests received for the passenger 114 and the differing passenger). The route system 122 can output various information pertaining to the ride-sharing trip.

The memory 120 can further include a seat reservation system 124 configured to assign a particular seat from the plurality of seats 112 in the autonomous vehicle 100 to the passenger 114 based on information pertaining to the passenger 114 and information pertaining to the ride-sharing trip. The information pertaining to the passenger 114 and the information pertaining to the ride-sharing trip can be utilized by the seat reservation system 124 to optimize seating assignments to allow for smooth pickup and drop off of passengers in a ride-sharing scenario. Moreover, the seat reservation system 124 can output, to the passenger 114, an indication of the particular seat assigned to the passenger. The seat reservation system 124 can likewise assign a differing seat from the plurality of seats 112 to the differing passenger, and output a differing indication to the differing passenger (as well as other passenger(s) of the autonomous vehicle 100).

The memory 120 additionally includes a control system 126. The control system 126 is configured to control at least one of the mechanical systems of the autonomous vehicle 100 (e.g., at least one of the vehicle propulsion system 106, the braking system 108 and/or the steering system 110). The control system 126 can control the mechanical systems of the autonomous vehicle 100 to travel along the route set by the route system 122, stop at pickup and drop off locations, and so forth.

The seat reservation system 124 of the autonomous vehicle 100 is now described in greater detail. As set forth above, the seat reservation system 124 can assign a particular seat in the autonomous vehicle 100 to the passenger 114 based on information pertaining to the passenger 114 and information pertaining to the ride-sharing trip. According to various embodiments, the information pertaining to the passenger can include a seat choice preference explicitly specified by the passenger 114.

For example, the seat choice preference explicitly specified by the passenger 114 can be retained in a profile of the passenger 114; the seat choice preference specified in the profile can be generally utilized when assigning the passenger 114 to seats for trips in autonomous vehicles in a fleet. The passenger 114 can explicitly specify the seat choice preference in his or her profile, and the seat choice preference from the profile can be utilized by the seat reservation system 124 to assign the passenger 114 to the particular seat in the autonomous vehicle 100. The profile of the passenger 114, for instance, can indicate that the passenger 114 explicitly specified a preference for seats in a particular location (e.g., a right side seat, a left side seat, a middle seat, a non-middle seat, a seat in a particular row) or seats oriented in a particular manner (e.g., forwards facing seats, backwards facing seats). The profile of the passenger 114, for instance, can be received by the autonomous vehicle (e.g., from a dispatch system, from a differing server computing system) in response to the dispatch system assigning the ride of the passenger 114 to the autonomous vehicle 100.

Pursuant to another example, the seat choice preference can be explicitly specified by the passenger 114 at a time of requesting the ride in the autonomous vehicle 100. The passenger 114 can request the ride in the autonomous vehicle 100 using a mobile computing device. The mobile computing device can receive real-time information specifying available seats in the autonomous vehicle 100. Further, the mobile computing device can be utilized by the passenger 114 (or a different user on behalf of the passenger 114) to provide an input concerning the seat choice preference (e.g., the passenger 114 can select a particular available seat for the ride in the autonomous vehicle 100 at the time of requesting the ride, prior to entry into the autonomous vehicle 100). In response to the input, the seat reservation system 124 of the autonomous vehicle 100 can assign the particular seat specified in the input to the passenger 114. Thus, the seat choice preference explicitly specified by the passenger 114 can be an indicator of a specific seat from the seats 112 in the autonomous vehicle 100 explicitly selected by the passenger 114 (e.g., selected based on the real-time information specifying the available seats in the autonomous vehicle 100). According to another example, the seat choice preference can be an explicit selection of a particular seat orientation (e.g., the passenger 114 specifies forwards facing seats only, the passenger 114 specifies backwards facing seats only). Pursuant to yet another example, the seat choice preference can be an explicit selection of a seat position (e.g., a right side seat, a left side seat, a middle seat, a non-middle seat, a seat in a particular row).

According to another example, the information pertaining to the passenger 114 can include inferred information identified from previous experiences of the passenger 114 riding in autonomous vehicles. For instance, the inferred information can include information concerning previous experiences of the passenger 114 encountering motion sickness when seated in particular seats in autonomous vehicles (e.g., seats at particular positions and/or orientations in autonomous vehicles). According to an illustration, if the passenger 114 has previously experienced motion sickness when seated in a backwards facing seat in an autonomous vehicle, then a profile of the passenger can include inferred information specifying that the passenger 114 is to be assigned to forward facing seats (e.g., since it can be inferred that a correlation exists between the passenger 114 experiencing motion sickness and the passenger 114 sitting in a backwards facing seat). Other examples of the inferred information identified from previous experiences of the passenger 114 riding in autonomous vehicles can include inferred information indicating that the passenger 114 may have difficulty maneuvering to a middle seat in an autonomous vehicle, inferred information indicating that the passenger 114 may have difficulty changing seats in an autonomous vehicle, inferred information indicating that the passenger 114 may have difficulty temporarily exiting an autonomous vehicle to allow a differing passenger to enter or exit the autonomous vehicle, inferred information indicating that the passenger 114 desirably enters or exits on a curb side of an autonomous vehicle, or the like.

The seat reservation system 124 can further be configured to infer information concerning the passenger 114 from parameters of a current ride of the passenger 114. The seat reservation system 124 can assign the particular seat to the passenger 114 based on the inferred information concerning the passenger 114 identified from the parameters of the current ride of the passenger 114. By way of example, the seat reservation system 124 can infer information based on an identity of a pickup location or a drop off location of the passenger 114. According to an illustration, if the passenger 114 has set a hospital or a doctor's office as a destination for the ride, then the seat reservation system 124 can infer that the passenger 114 may have more difficulty sitting in a backwards facing seat or a seat that is away from a curb side of the autonomous vehicle.

As noted above, the seat reservation system 124 can further assign the particular seat from the seats 112 to the passenger 114 based on the information pertaining to the ride-sharing trip. The information pertaining to the ride-sharing trip can include an order in which passengers are picked up and/or an order in which passengers are dropped off. Further, the information pertaining to the ride-sharing trip can include a pickup location at which the passenger 114 is to be picked up and/or a drop off location at which the passenger 114 is to be dropped off. The information pertaining to the ride-sharing trip can additionally or alternatively include a pickup location at which the differing passenger is to be picked up and/or a drop off location at which the differing passenger is to be dropped off. Pickup location(s) and/or drop off location(s) of other passenger(s) to be concurrently transported by the autonomous vehicle 100 can similarly be utilized by the seat reservation system 124 to assign the particular seat to the passenger 114.

The seat reservation system 124 can output the indication of the particular seat assigned to the passenger 114 by transmitting the indication of the particular seat assigned to the passenger 114 to a mobile computing device of the passenger 114, for example. Such transmission can be a push notification sent to the mobile computing device of the passenger 114. The indication of the particular seat assigned the passenger 114 can be transmitted at a time an autonomous vehicle ride request is received from the mobile computing device of the passenger 114 (e.g., in response to receipt of the autonomous vehicle ride request). According to other examples, the indication of the particular seat assigned to the passenger 114 can be transmitted to the mobile computing device upon arrival of the autonomous vehicle 100 (e.g., when the autonomous vehicle 100 is within a threshold distance from the passenger 114 or from the pickup location prior to picking up the passenger 114), when the passenger 114 enters the autonomous vehicle 100, or the like. It is also contemplated that the seat reservation system 124 can output the indication of the particular seat assignment to the passenger 114 by causing the indication to be presented on a display included in or on the autonomous vehicle 100.

Pursuant to an example, the indication of the particular seat assigned to the passenger 114 can be outputted by the seat reservation system 124 to the passenger 114 prior to the passenger 114 entering the autonomous vehicle 100 (e.g., when the autonomous vehicle 100 approaches the passenger 114 for pick up). According to another example, the indication of the particular seat assigned to the passenger 114 can be outputted by the seat reservation system 124 to the passenger 114 when the passenger 114 enters the autonomous vehicle 100. Yet, according to other examples, it is to be appreciated that the indication of the particular seat assigned to the passenger 114 can be outputted by the seat reservation system 124 to the passenger 114 subsequent to the passenger 114 entering the autonomous vehicle 100. For instance, the indication of the particular seat assigned to the passenger 114 can be an updated seat assignment received when the passenger 114 is reassigned to a differing seat from the plurality of seats 112 in the autonomous vehicle 100.

Moreover, the seat reservation system 124 can request that a passenger 114 change seats to allow for smooth pickup and/or drop off of the passenger 114 and/or a differing passenger. Subsequent to initiation of transporting of the passenger 114 for the ride-sharing trip with the passenger 114 seated in the particular seat, the seat reservation system 124 can be configured to reassign the passenger 114 to a differing seat from the plurality of seats 112 in the autonomous vehicle 100. Similar to above, the seat reservation system 124 can reassign the passenger 114 to the differing seat from the plurality of seats 112 in the autonomous vehicle 100 based on the information pertaining to the passenger 114 and the information pertaining to the ride-sharing trip. Further, the seat reservation system 124 can output, to the passenger 114, a differing indication of the differing seat to which the passenger 114 is reassigned. It is to be appreciated that the seat reservation system 124 can output the differing indication of the differing seat to which the passenger 114 is reassigned when the autonomous vehicle 100 is stopped (e.g., to cause the passenger 114 to change seats while the autonomous vehicle 100 is stopped).

According to an example, the seat reservation system 124 can reassign the passenger 114 to the differing seat based on a side of the autonomous vehicle 100 from which the passenger 114 is to exit the autonomous vehicle 100. According to an illustration, if the passenger 114 is currently seated in a seat on a left side of the autonomous vehicle 100 and a drop off location for the passenger 114 will be on a right side of the autonomous vehicle 100, then the seat reservation system 124 can reassign the passenger 114 from the seat on the left side of the autonomous vehicle 100 to a seat on the right side of the autonomous vehicle 100, assuming that the seat on the right side of the autonomous vehicle 100 is vacant.

According to another example, the passenger 114 can be reassigned to the differing seat based on a side of the autonomous vehicle 100 from which the differing passenger is to enter or exit the autonomous vehicle 100. For instance, if the passenger 114 is currently seated in a seat on the left side of the autonomous vehicle 100 and the autonomous vehicle 100 is to pick up the differing passenger on the left side of the autonomous vehicle 100, then the seat reservation system 124 can reassign the passenger 114 from the seat on the left side of the autonomous vehicle 100 to a seat on the right side of the autonomous vehicle 100, assuming that the seat on the right side of the autonomous vehicle 100 is vacant. Thus, the seat on the left side of the autonomous vehicle 100 can be made available for the subsequent pickup of the differing passenger on the left side of the autonomous vehicle 100.

In contrast to the approaches set forth herein, an autonomous vehicle that lacks the seat reservation techniques described herein may encounter various challenges with respect to seating arrangements of passengers (e.g., due to the lack of a driver directing passenger(s) to sit in particular seat(s)). Below are various illustrations of challenges that may otherwise occur if the techniques set forth herein are not employed.

According to an illustration where the seat reservation techniques are not employed, a first passenger may be sitting in a seat in an autonomous vehicle on a right side of the autonomous vehicle. Without a driver to request that the first passenger move to a different seat in the autonomous vehicle, a second passenger being picked up on a right side of the autonomous vehicle may be blocked from entering the autonomous vehicle by the first passenger sitting in the seat on the right side of the autonomous vehicle. The first passenger may or may not move from the seat on the right side when the second passenger is being picked up. Thus, the second passenger may need to walk around the autonomous vehicle to enter on the left side if the first passenger does not move (e.g., to the side of the vehicle closest to traffic), which can make entering the vehicle more difficult for the second passenger.

In accordance with another illustration where the seat reservation techniques are not employed, a first passenger may be sitting in a seat on a left side of an autonomous vehicle and a second passenger may be sitting in a seat on a right side of the autonomous vehicle. The autonomous vehicle may stop to drop off the first passenger at a drop off location that is on the right side of the autonomous vehicle, while the second passenger is to continue riding in the autonomous vehicle. Accordingly, the first passenger may be unable to exit the autonomous vehicle on the right side due to the second passenger being seated in the seat on the right side of the autonomous vehicle (e.g., if the second passenger is unwilling or unable to allow the first passenger to pass or move out of the way), and instead, the first passenger may need to exit the vehicle on the left side (e.g., the side of the vehicle closest to traffic, exiting on the left side may be more difficult than exiting on the right side).

Pursuant to yet another illustration where the seat reservation techniques are not employed, a passenger of an autonomous vehicle may experience motion sickness when seated in particular seats in the autonomous vehicle. For instance, one or more of the seats may be backwards facing (e.g., when seated in the backwards facing seat the passenger may be oriented towards a rear of the autonomous vehicle opposite a direction of travel of the autonomous vehicle). Due to the autonomous vehicle lacking a driver, it may be more difficult to coordinate changing of seats in the autonomous vehicle (e.g., if all forwards facing seats of the autonomous vehicle are currently occupied by passengers, if all seats of the autonomous vehicle are currently occupied by passengers).

Figure 2:
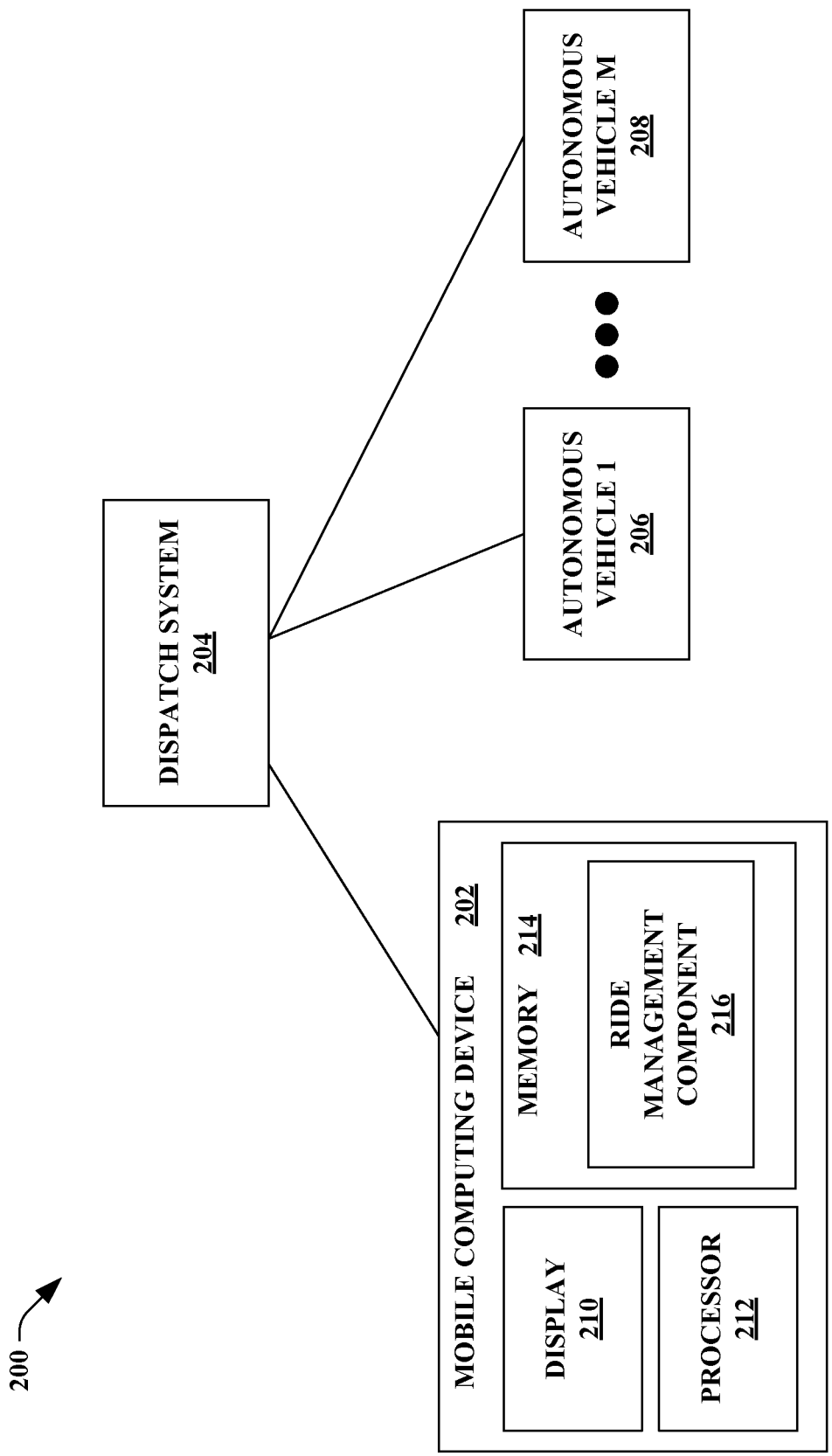
FIG. 2 illustrates an exemplary system that includes a mobile computing device configured to request a ride in an autonomous vehicle for a passenger.

Now turning to FIG. 2, illustrated is a system 200 that includes a mobile computing device 202 that is configured to request a ride in an autonomous vehicle for a passenger (e.g., a user of the mobile computing device 202, the passenger 114). The system 200 further includes a dispatch system 204 and a plurality of autonomous vehicles, namely, an autonomous vehicle 1 206, . . . , and an autonomous vehicle M 208, where M can be substantially any integer greater than one (collectively referred to herein as autonomous vehicles 206-208). Each of the autonomous vehicles 206-208 can be substantially similar to the autonomous vehicle 100 described herein.

The mobile computing device 202 includes a display 210, a processor 212, and memory 214. The memory 214 includes computer-executable instructions that are executed by the processor 212. The memory 214 can include a ride management component 216 configured to transmit an autonomous vehicle ride request for a passenger. The autonomous vehicle ride request for the passenger can specify a pickup location, a drop off location, a pickup time, or the like. For instance, the autonomous vehicle ride request can be transmitted to the dispatch system 204. The dispatch system 204 can match the autonomous vehicle ride request for the passenger to a particular autonomous vehicle from the autonomous vehicles 206-208. According to an example, the dispatch system 204 can assign the ride of the passenger to the autonomous vehicle 1 206 (e.g., the autonomous vehicle 100).

Continued reference is made below to the example where the ride of the passenger is assigned to the autonomous vehicle 1 206; yet, it is contemplated that the following can be extended to scenarios where the ride of the passenger is assigned to a differing autonomous vehicle in the autonomous vehicles 206-208. The autonomous vehicle 1 206 is to transport at least the passenger and a differing passenger during at least a portion of a ride-sharing trip. The passenger and the differing passenger independently request rides in the autonomous vehicle 1 206. For instance, the passenger can utilize the ride management component 216 of the mobile computing device 202 to transmit the autonomous vehicle ride request for the passenger to the dispatch system 204 as noted above, whereas the differing passenger can utilize a differing mobile computing device to transmit a differing autonomous vehicle ride request for the differing passenger to the dispatch system 204.

Moreover, the ride management component 216 of the mobile computing device 202 can receive an indication of a particular seat from a plurality of seats in the autonomous vehicle 1 206 assigned to the passenger. The ride management component 216 can further be configured to cause the display 210 to present the indication of the particular seat from the plurality of seats in the autonomous vehicle 1 206 assigned to the passenger.

According to various embodiments, the display 210 can be caused by the ride management component 216 to present the indication of the particular seat in the autonomous vehicle 1 206 assigned to the passenger prior to the passenger entering the autonomous vehicle 1 206. For instance, the display 210 can present the indication of the particular seat assigned to the passenger in response to the ride of the passenger being assigned by the dispatch system 204 to the autonomous vehicle 1 206. Pursuant to other examples, the display 210 can present the indication of the particular seat assigned to the passenger in response an explicit selection of the particular seat by the passenger via the mobile computing device 202, in response to the autonomous vehicle 1 206 being within a threshold distance from a pickup location for the passenger, in response to the autonomous vehicle 1 206 being within a threshold distance from a location of the mobile computing device 202, or the like.

According to other embodiments, the display 210 can be caused to present the indication of the particular seat in the autonomous vehicle 1 206 assigned to the passenger when the passenger enters the autonomous vehicle 1 206 or subsequent to entry into the autonomous vehicle 1 206. For instance, the display 210 can present the indication to the passenger in response to the passenger being reassigned to a differing seat in the autonomous vehicle 1 206.

Pursuant to various examples, the autonomous vehicle 1 206 can assign the passenger to the particular seat. The autonomous vehicle 1 206 can assign the passenger to the particular seat as described herein.

According to other examples, the passenger can utilize the mobile computing device 202 to reserve the particular seat. For instance, the ride management component 216 can receive an indication that the particular seat in the autonomous vehicle 1 206 is available for the passenger. The autonomous vehicle 1 206 can transmit real-time information specifying currently vacant/unreserved seats. Such information can be received by the ride management component 216 and presented on the display 210. Moreover, the ride management component 216 can reserve the particular seat in the autonomous vehicle 1 206 for the passenger based on input received by the mobile computing device 202. For instance, the passenger can explicitly select a particular available seat for the requested ride in the autonomous vehicle 1 206. Accordingly, the indication that the particular seat in the autonomous vehicle 1 206 is assigned to the passenger can be received responsive to the particular seat in the autonomous vehicle 1 206 being reserved for the passenger based on the input received by the mobile computing device 202.

In a situation where the passenger is assigned a backwards facing seat (e.g., where the autonomous vehicle 1 206 assigns the passenger to the backwards facing seat, where the passenger selects a backwards facing seat), the ride management component 216 can cause the display 210 to present an indication that the passenger is assigned a backwards facing seat for an upcoming ride in the autonomous vehicle 1 206. Thus, the passenger can be notified prior to the ride regarding the backwards facing seat to which the passenger is assigned. According to various embodiments, it is to be appreciated that the passenger can be given an option to either change the seat or request that the passenger be assigned to a different autonomous vehicle having a forwards facing seat available for the passenger.

Pursuant to an illustration, if the passenger is assigned a backwards facing seat in the autonomous vehicle 1 206 (and the autonomous vehicle 1 206 lacks an available forwards facing seat for the passenger), then the ride management component 216 can present an option on the display 210 indicating that the passenger can switch to riding in the autonomous vehicle M 208, which has an available forwards facing seat. Following this illustration, if switching autonomous vehicles results in a later pickup time or a later drop off time, then the ride management component 216 can present an indication of a time delay that would result from switching autonomous vehicles on the display 210 (e.g., the autonomous vehicle 1 206 with the available backwards facing seat can pick up the passenger in 5 minutes whereas the autonomous vehicle M 208 with the available forwards facing seat can pick up the passenger in 10 minutes, switching autonomous vehicles can result in a 10 minute delay in reaching a drop off location).

According to another illustration, reserving different seats in an autonomous vehicle can have different costs. For instance, switching from a backwards facing seat to a forwards facing seat can be associated with an increased cost for the ride. Pursuant to another illustration, different passengers can place bids on various seats.

According to various examples, the autonomous vehicle ride request sent by the ride management component 216 of the mobile computing device 202 can further specify information pertaining to an object to accompany the passenger on the ride-sharing trip (e.g., type of object, size of the object, number of objects, etc.). Accordingly, the passenger can be assigned to the particular seat (e.g., by the autonomous vehicle 1 206) based at least in part on the information pertaining to the object(s). For instance, the ride management component 216 can receive input specifying a number of pieces of luggage carried by the passenger to accompany the passenger on the trip. The particular seat can be selected based on the number of pieces of luggage carried by the passenger. Moreover, the information pertaining to the object can be utilized by the autonomous vehicle 1 206 when determining whether to reassign the passenger to a different seat (e.g., if the passenger is carrying groceries with him or her on the ride then the autonomous vehicle 1 206 can be inhibited from reassigning the passenger from a first seat to a second seat once the passenger is seated in the first seat).

In accordance with various embodiments, it is contemplated that the dispatch system 204 (or a differing server system) can assign a passenger to a particular seat in a particular one of the autonomous vehicles 206-208. For instance, the dispatch system 204 can include the seat reservation system 124 or a portion thereof; thus, the dispatch system 204 can perform at least a portion of the operations described herein as being performed by the seat reservation system 124 of an autonomous vehicle (e.g., the autonomous vehicle 100).

Figure 3:
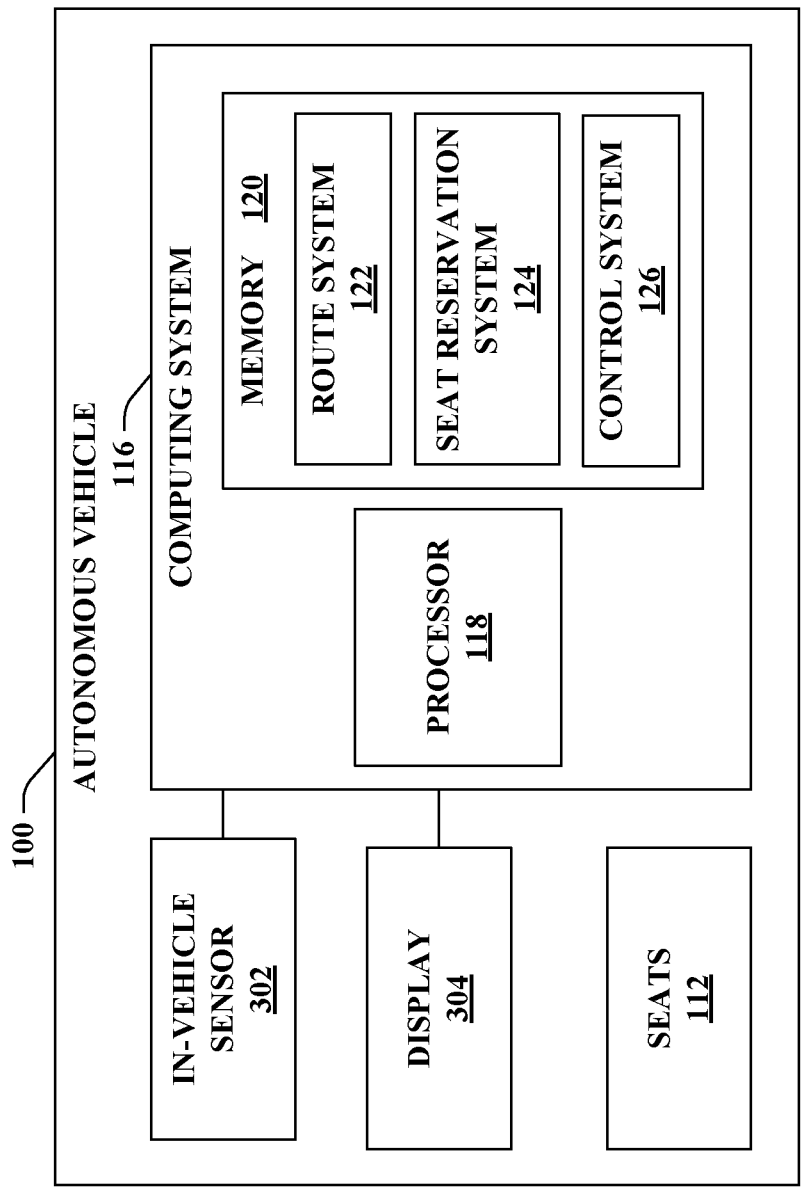
FIG. 3 illustrates a functional block diagram of another exemplary autonomous vehicle.

Referring now to FIG. 3, illustrated is another example of the autonomous vehicle 100. As depicted in FIG. 3, the autonomous vehicle 100 again includes the seats 112 and the computing system 116, where the computing system includes the processor 118 and memory 120 (including the route system 122, the seat reservation system 124, and the control system 126). Although not shown, it is to be appreciated that the autonomous vehicle 100 also includes the sensor systems 102-104 and the mechanical systems (e.g., the vehicle propulsion system 106, the braking system 108, and the steering system 110).

In the example of FIG. 3, the autonomous vehicle 100 further includes an in-vehicle sensor 302. Various types of in-vehicle sensors are intended to fall within the scope of the hereto appended claims.

Pursuant to various embodiments, the in-vehicle sensor 302 can detect whether each of the seats 112 in the autonomous vehicle 100 are occupied or vacant. The in-vehicle sensor 302 can identify which seats are being utilized by which passengers; however, it is also contemplated that the in-vehicle sensor 302 can instead evaluate the occupancy of each of the seats 112 without determining identities of passengers in each of the seats 112. Examples of such an in-vehicle sensor include a camera, pressure sensors embedded in the seats 112, or the like. The seat reservation system 124 can obtain real-time information regarding availability of the seats 112 in the autonomous vehicle 100 from the in-vehicle sensor 302.

According to an example, the real-time information can be transmitted to a mobile computing device of a passenger to be picked up (e.g., the mobile computing device 202). Providing the real-time information regarding the availability of the seats 112 to the mobile computing device can allow the passenger utilizing the mobile computing device to view the availability and reserve a particular one of the available seats.

Pursuant to another example, the real-time information regarding availability of the seats 112 can be transmitted to a dispatch system (e.g., the dispatch system 204). Following this example, the dispatch system can match a passenger to a particular autonomous vehicle for a ride based on the availability of the seats 112. For instance, if a pickup location for the passenger is on a left side of an autonomous vehicle, then the dispatch system 204 can select a particular autonomous vehicle from a fleet based at least in part on the particular autonomous vehicle having an available seat on a left side.

In accordance with various embodiments, the in-vehicle sensor 302 can detect object(s) with the passenger in the autonomous vehicle 100. An example of such an in-vehicle sensor is a camera. For instance, the in-vehicle sensor 302 can identify that the passenger has a plurality of bags with her or him. Based on the detected plurality of bags, it may be more difficult for the passenger to reposition to a differing seat in the autonomous vehicle 100. Thus, the seat reservation system 124 can inhibit reassigning the passenger from the particular seat in which he or she is currently seated to a differing seat based upon detection of the objects being with the passenger.

Pursuant to various embodiments, the in-vehicle sensor 302 can be utilized to detect a condition of the passenger. The condition of the passenger can be detected subsequent to initiation of the transporting of the passenger for the ride-sharing trip with the passenger seated in the particular seat (e.g., when the passenger enters the autonomous vehicle 100, when the passenger sits in the particular seat). The seat reservation system 124 can assign or reassign the seat to the passenger based on the detected condition of the passenger. For instance, the seat reservation system 124 can be configured to reassign the passenger from the particular seat to the differing seat, where such reassigning is selectively enabled when the condition is not detected and the reassigning is selectively disabled when the condition is detected. According to an example, the condition can be whether the passenger is carrying an object with him or her (e.g., the seat of the passenger can be reassigned when the passenger is not carrying an object whereas reassigning the seat of the passenger can be disabled when the passenger is carrying an object. Other examples of the condition of the passenger can include a physical condition or disability of the passenger (e.g., reassigning the seat of the passenger can be disabled when the passenger is detected to have a leg in a cast).

According to another example, the in-vehicle sensor 302 can be a temperature sensor. The temperature sensor can be utilized to scan a temperature of a passenger entering into the autonomous vehicle 100 or a passenger sitting in the autonomous vehicle 100. Based on the temperature of the passenger, the seat reservation system 124 can potentially adjust the seating assignment for the passenger or the seating assignment(s) for other passenger(s) in the autonomous vehicle 100. For instance, if the passenger is determined to be sick (e.g., the temperature sensor detects that the passenger has a temperature above a threshold temperature), then the passenger can be seated in a seat farther away from other passengers in the autonomous vehicle 100.

According to another example, the in-vehicle sensor 302 can include a heart rate monitor. Following this example, the heart rate monitor can be utilized to detect potential motion sickness of a passenger during a trip. Such information can be utilized to infer information about the passenger concerning experiences riding in the autonomous vehicle 100. For instance, if determined that the passenger is experiencing motion sickness, then such information can be utilized to assign the passenger to different types of seats for subsequent rides (e.g., if the passenger is seated in a backwards facing seat then such information can be retained in a profile of the passenger). According to another example, a facial recognition sensor can be utilized to similarly analyze motion sickness experienced by the passenger.

The autonomous vehicle 100 can further include a display 304. The display 304 can present an indication of the particular seat assigned to the passenger. According to another example, the display 304 can present an indication of a particular seat to which the passenger is reassigned.

Figure 4:
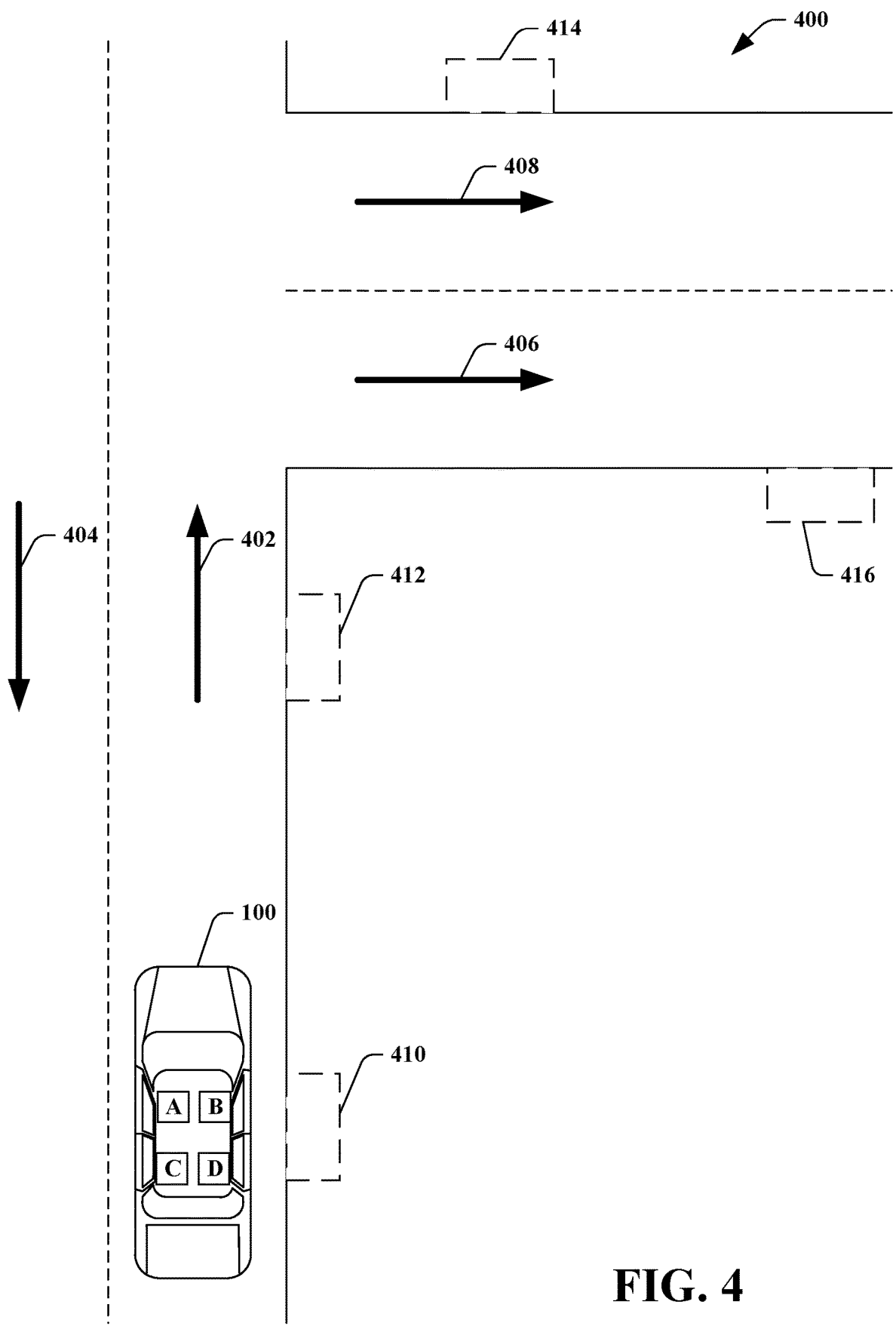
FIG. 4 illustrates an exemplary driving environment in which an autonomous vehicle operates.

With reference to FIG. 4, illustrated is an exemplary driving environment 400 in which the autonomous vehicle 100 operates. In the example of FIG. 4, the autonomous vehicle 100 includes four seats (seat A, seat B, seat C, and seat D). Arrows 402, 404, 406, and 408 represent traffic directions in lanes of depicted roadways shown in the driving environment 400. FIG. 4 depicts the autonomous vehicle 100 at a location 410 at a first time. The location 410 can be a pickup location or a drop off location for passenger(s) (e.g., the passenger, the differing passenger). For purposes of illustration, a locations 412, a location 414, and a location 416 are also depicted in the driving environment 400. The locations 412-416 can likewise be pickup locations and/or drop off locations for passenger(s). The autonomous vehicle 100 can travel from the location 410 to one or more of the locations 412-416. As shown, the location 410 is on a right side of the autonomous vehicle 100, the location 412 is on the right side of the autonomous vehicle 100, the location 414 is on a left side of the autonomous vehicle 100, and the location 414 is on the right side of the autonomous vehicle 100.

According to an example, the location 410 can be a drop off location for a first passenger and the location 414 can be a drop off location for a second passenger. Following this example, the first passenger can be assigned to a seat on the right side of the autonomous vehicle 100 (seat B or seat D), whereas the second passenger can be assigned to a seat on the left side of the autonomous vehicle 100 (seat A or seat C).

Pursuant to another example, the location 410 can be a pickup location for a first passenger, the location 412 can be a pickup location for a second passenger, and the location 416 can be a pickup location for a third passenger. In accordance with this example, the first passenger can be assigned to a seat on the left side of the autonomous vehicle 100 (seat A or seat C). By assigning the first passenger to the seat on the left side of the autonomous vehicle 100, then the first passenger does not block the second passenger entering the autonomous vehicle on the right side at the location 412 or the third passenger entering the autonomous vehicle on the right side at the location 414 (e.g., the second passenger and the third passenger can be assigned to seats on the right side of the autonomous vehicle 100).

Moreover, it is contemplated that seat assignments can be made based on a number of passengers traveling together. For instance, if a first passenger and a second passenger are traveling together (e.g., in a group, based on a common ride request), then seats that are next to each (regardless of whether the autonomous vehicle 100 includes or lacks backwards facing seat) or across from each other (assuming two backwards facing seats and two forward facing seats) can be assigned to the first passenger and the second passenger.

According to another example, if a passenger is carrying object(s) that require more room in the autonomous vehicle 100, then the passenger can request that more than one seat be reserved for the ride for the passenger. The plurality of seats can be assigned to the passenger and his or her object(s) in accordance with the various techniques described herein.

Figure 5:
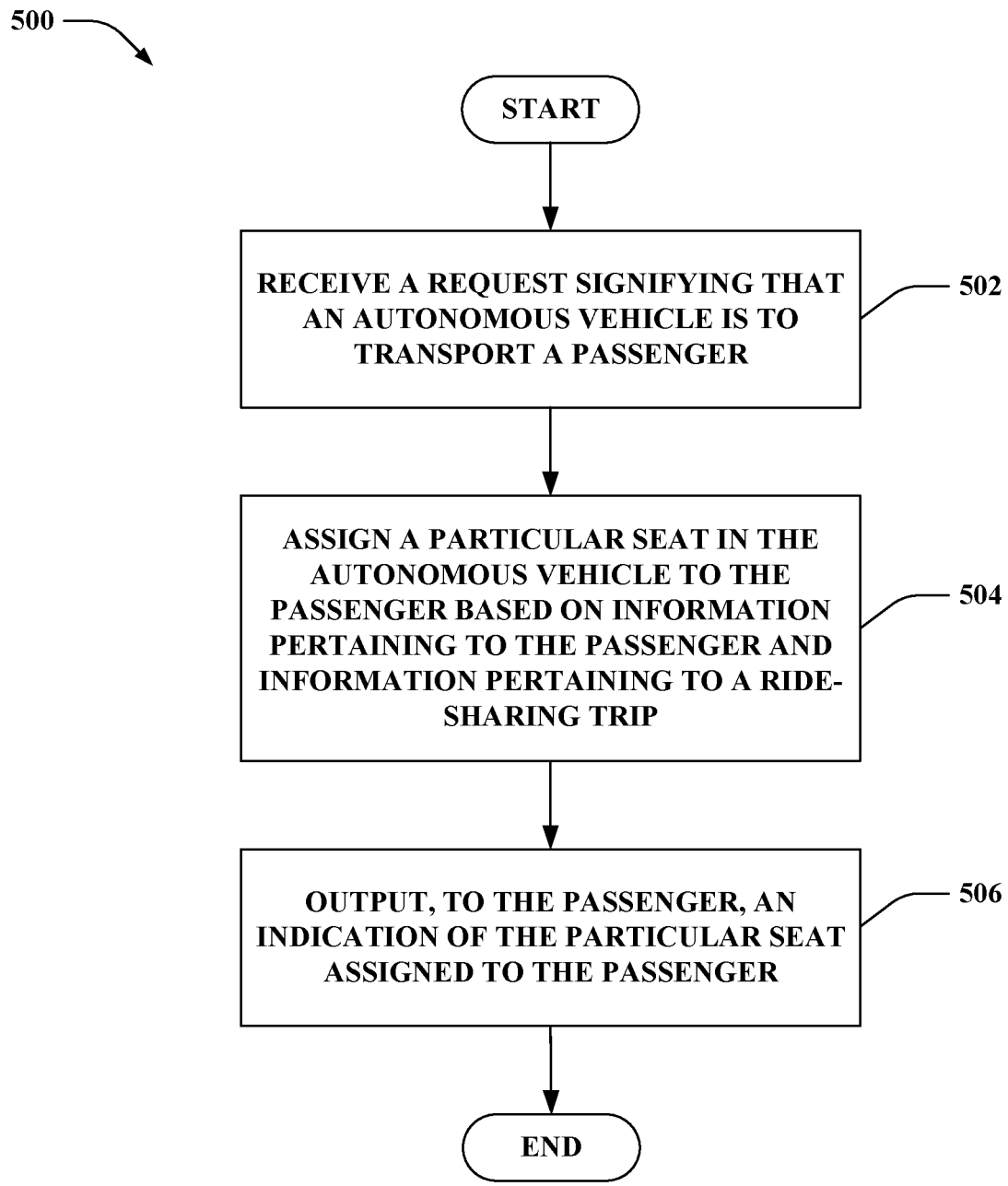
FIG. 5 is a flow diagram that illustrates an exemplary methodology of operating an autonomous vehicle to reserve a seat for a passenger.
Figure 6:
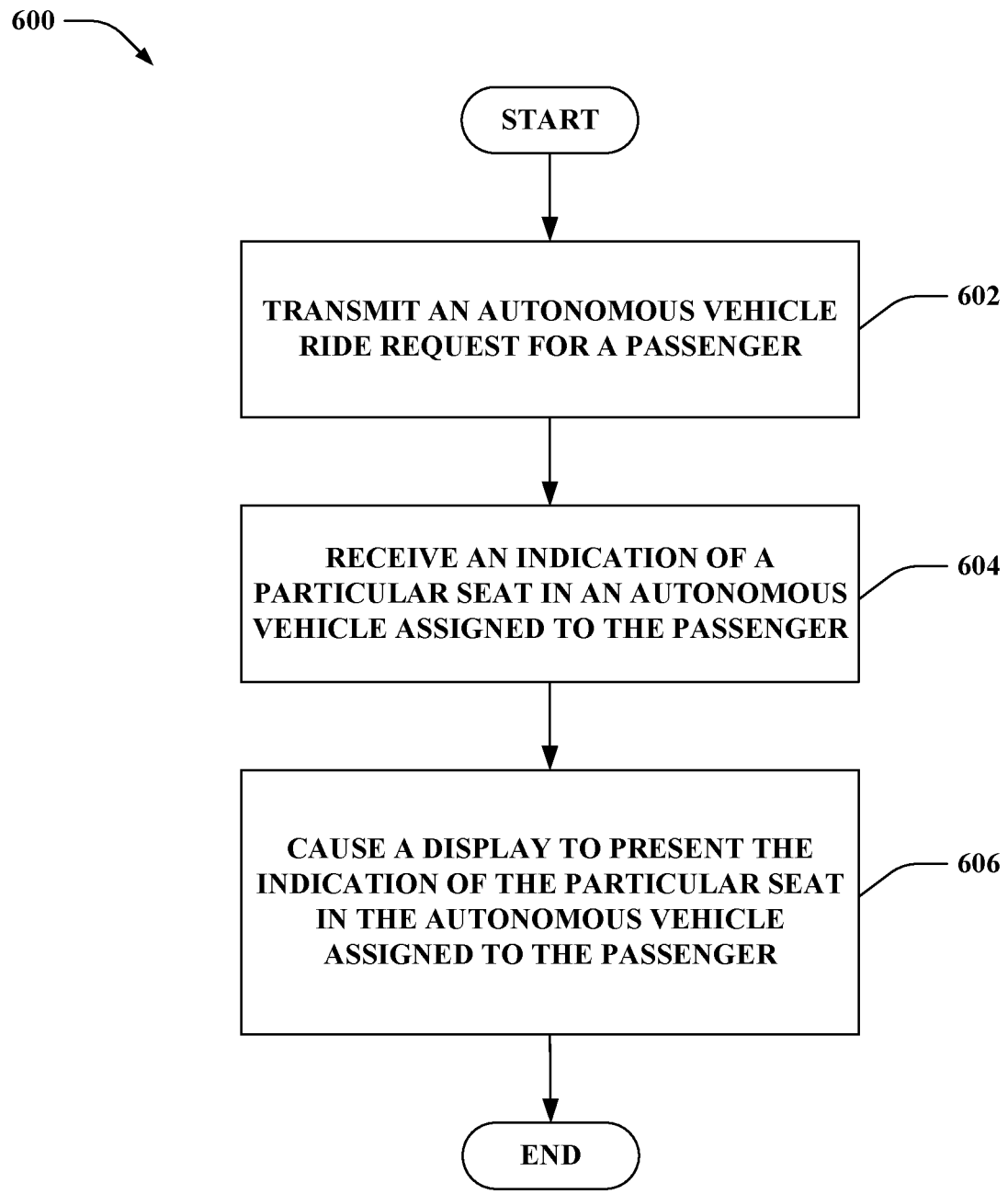
FIG. 6 is a flow diagram that illustrates an exemplary methodology of operating a mobile computing device to reserve a seat in an autonomous vehicle.

FIGS. 5-6 illustrate exemplary methodologies relating to reserving seats in an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of operating an autonomous vehicle to reserve a seat for a passenger. At 502, a request signifying that the autonomous vehicle is to transport the passenger can be received by the autonomous vehicle. For instance, the request can be received from a dispatch system. Moreover, a differing request signifying that the autonomous vehicle is to transport a differing passenger can also be received by the autonomous vehicle. The autonomous vehicle is to transport at least the passenger and the differing passenger during at least a portion of a ride-sharing trip. Moreover, the passenger and the differing passenger independently requested autonomous vehicle rides. At 504, responsive to the request, a particular seat from a plurality of seats in the autonomous vehicle can be assigned to the passenger based on information pertaining to the passenger and information pertaining to the ride-sharing trip. At 506, an indication of the particular seat assigned to the passenger can be outputted to the passenger.

Turning to FIG. 6, illustrated is a methodology 600 of operating a mobile computing device to reserve a seat in an autonomous vehicle. At 602, an autonomous vehicle ride request for a passenger can be transmitted by the mobile computing device. At 604, an indication of a particular seat from a plurality of seats in the autonomous vehicle assigned to the passenger can be received. The autonomous vehicle is to transport at least the passenger and a differing passenger during at least a portion of a ride-sharing trip. Further, the passenger and the differing passenger independently request rides in the autonomous vehicle. At 606, a display of the mobile computing device can be caused to present the indication of the particular seat from the plurality of seats in the autonomous vehicle assigned to the passenger.

Figure 7:
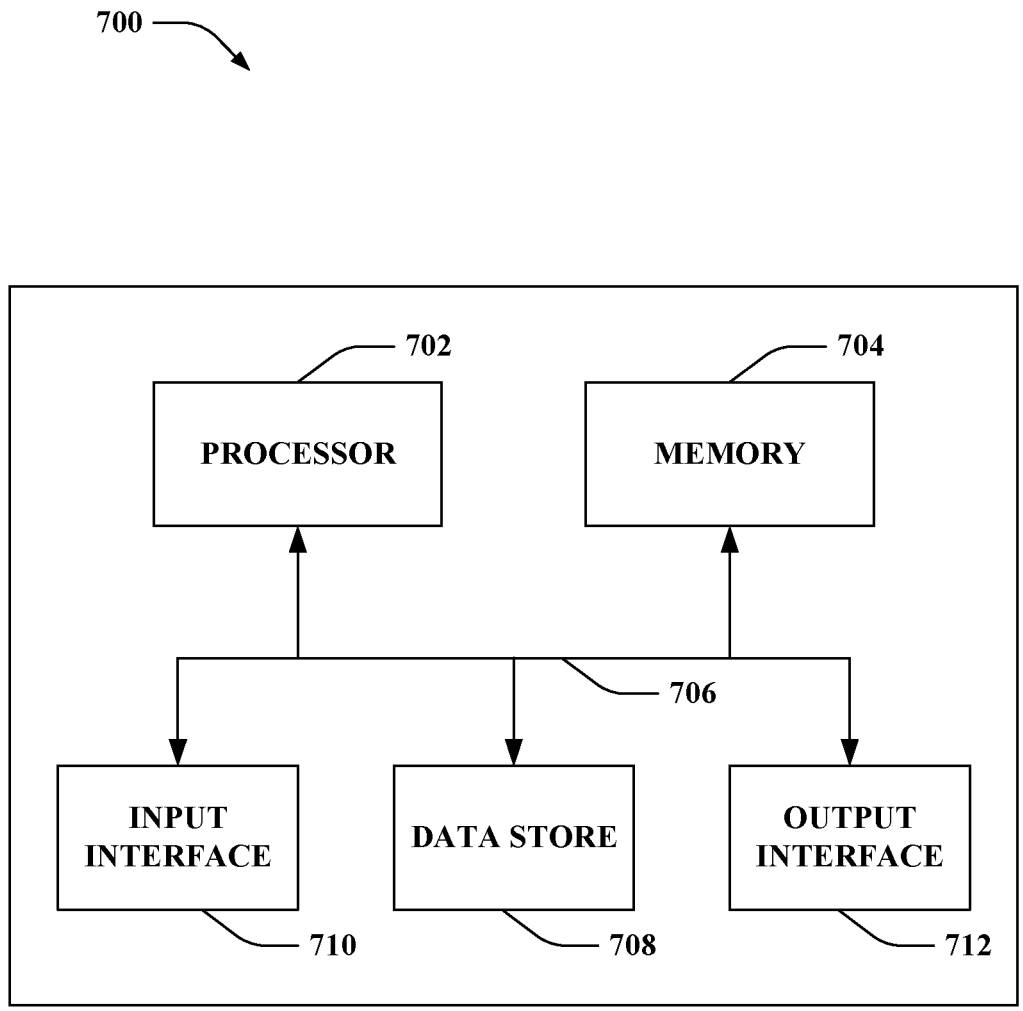
FIG. 7 illustrates an exemplary computing device.

Referring now to FIG. 7, a high-level illustration of an exemplary computing device 700 that can be used in accordance with the systems and methodologies disclosed herein is illustrated. For instance, the computing device 700 may be or include the computing system 116. The computing device 700 includes at least one processor 702 that executes instructions that are stored in a memory 704. The instructions may be, for instance, instructions for implementing functionality described as being carried out by one or more systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also store passenger profiles, information pertaining to passengers, information pertaining to a ride-sharing trip, and so forth.

The computing device 700 additionally includes a data store 708 that is accessible by the processor 702 by way of the system bus 706. The data store 708 may include executable instructions, passenger profiles, information pertaining to passengers, information pertaining to a ride-sharing trip, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a plurality of seats; and
   a computing system, comprising:
   a processor; and
   memory that stores computer-executable instructions that, when executed by the processor, cause the processor to perform acts comprising:
   assigning a particular seat from the plurality of seats in the autonomous vehicle to a passenger based on information pertaining to the passenger and information pertaining to a ride-sharing trip, wherein the autonomous vehicle is to transport at least the passenger and a differing passenger during at least a portion of the ride-sharing trip, wherein the passenger and the differing passenger independently request rides in the autonomous vehicle, and wherein the information pertaining to the passenger comprises a physical condition of the passenger;
   outputting, to the passenger, an indication of the particular seat assigned to the passenger;
   causing the autonomous vehicle to stop to pick up the passenger;
   subsequent to initiation of transporting of the passenger for the ride-sharing trip with the passenger seated in the particular seat, reassigning the passenger to a differing seat from the plurality of seats in the autonomous vehicle;
   outputting, to the passenger, a differing indication of the differing seat to which the passenger is reassigned; and
   detecting the physical condition of the passenger subsequent to the initiation of the transporting of the passenger for the ride-sharing trip with the passenger seated in the particular seat, wherein the physical condition of the passenger is a physical disability of the passenger, wherein reassigning of the passenger from the particular seat to the differing seat is selectively enabled when the physical condition of the passenger is not detected, and wherein the reassigning of the passenger from the particular seat to the differing seat is selectively disabled when the physical condition of the passenger is detected.

2. The autonomous vehicle of claim 1, wherein outputting the indication of the particular seat assigned to the passenger comprises transmitting the indication of the particular seat assigned to the passenger to a mobile computing device of the passenger.

3. The autonomous vehicle of claim 1, wherein the indication of the particular seat assigned to the passenger is outputted to the passenger prior to the passenger entering the autonomous vehicle.

4. The autonomous vehicle of claim 1, wherein the indication of the particular seat assigned to the passenger is outputted to the passenger when the passenger enters the autonomous vehicle.

5. The autonomous vehicle of claim 1, wherein the information pertaining to the passenger further comprises a seat choice preference explicitly specified by the passenger.

6. The autonomous vehicle of claim 1, wherein the information pertaining to the passenger further comprises inferred information identified from previous experiences of the passenger riding in autonomous vehicles.

7. The autonomous vehicle of claim 1, wherein the information pertaining to the ride-sharing trip comprises at least one of an order in which passengers are picked up or an order in which the passengers are dropped off, wherein the passengers comprise at least the passenger and the differing passenger.

8. The autonomous vehicle of claim 1, wherein the information pertaining to the ride-sharing trip comprises at least one of a pickup location at which the passenger is to be picked up or a drop off location at which the passenger is to be dropped off.

9. The autonomous vehicle of claim 1, wherein the information pertaining to the ride-sharing trip comprises at least one of a pickup location at which the differing passenger is to be picked up or a drop off location at which the differing passenger is to be dropped off.

10. The autonomous vehicle of claim 1, wherein the passenger is reassigned to the differing seat based on a side of the autonomous vehicle from which the passenger is to exit the autonomous vehicle.

11. The autonomous vehicle of claim 10, wherein the passenger is reassigned to the differing seat based on a side of the autonomous vehicle from which the differing passenger is to at least one of enter or exit the autonomous vehicle.

12. The autonomous vehicle of claim 1, further comprising:
a sensor configured to detect occupancy of each of the plurality of seats in the autonomous vehicle.

13. The autonomous vehicle of claim 1, wherein the physical condition of the passenger is inferred from an identity of at least one of a pickup location at which the passenger is to be picked up or a drop off location at which the passenger is to be dropped off.

14. The autonomous vehicle of claim 1, wherein the physical condition of the passenger is inferred from previous experiences of the passenger riding in autonomous vehicles, and wherein the physical condition identified from previous experiences of the passenger riding in autonomous vehicles comprises prior potential motion sickness of the passenger detected by an autonomous vehicle sensor.

15. A mobile computing device, comprising:
a display;
a processor; and
memory that stores computer-executable instructions that, when executed by the processor, cause the processor to perform acts comprising:
transmitting an autonomous vehicle ride request for a passenger;
receiving an indication of a particular seat from a plurality of seats in a first autonomous vehicle assigned to the passenger, wherein the first autonomous vehicle is to transport at least the passenger and a differing passenger during at least a portion of a ride-sharing trip, wherein the passenger and the differing passenger independently request rides in the first autonomous vehicle, and wherein the particular seat assigned to the passenger is a rear-facing seat in the first autonomous vehicle;
causing the display to present the indication of the particular seat from the plurality of seats in the first autonomous vehicle assigned to the passenger;
causing the display to present an option to switch to being assigned to a forward-facing seat in a second autonomous vehicle; and
responsive to an input received by the mobile computing device, switching the passenger to be assigned to the forward-facing seat in the second autonomous vehicle, wherein the second autonomous vehicle is caused to pick up the passenger.

16. The mobile computing device of claim 15, the acts further comprising:
receiving an indication that the forward-facing seat in the second autonomous vehicle is available for the passenger, wherein the indication further specifies a time delay that would result from switching from the first autonomous vehicle to the second autonomous vehicle, and wherein causing the display to present the option to switch to being assigned to the forward-facing seat in the second autonomous vehicle further comprises causing the display to present the time delay that would result from switching from the first autonomous vehicle to the second autonomous vehicle; and
reserving the forward-facing seat in the second autonomous vehicle for the passenger based on the input received by the mobile computing device.

17. The mobile computing device of claim 15, wherein the autonomous vehicle ride request further specifies information pertaining to an object to accompany the passenger on the ride-sharing trip, and wherein the passenger is assigned to the particular seat based at least in part on the information pertaining to the object.

18. A method of operating an autonomous vehicle to reserve a seat for a passenger, comprising:
receiving, at the autonomous vehicle, a request signifying that the autonomous vehicle is to transport the passenger, wherein the autonomous vehicle is to transport at least the passenger and a differing passenger during at least a portion of a ride-sharing trip, and wherein the passenger and the differing passenger independently requested autonomous vehicle rides;
responsive to the request, assigning a particular seat from a plurality of seats in the autonomous vehicle to the passenger based on information pertaining to the passenger and information pertaining to the ride-sharing trip, and wherein the information pertaining to the passenger comprises a physical disability of the passenger;

outputting, to the passenger, an indication of the particular seat assigned to the passenger;

causing the autonomous vehicle to stop to pick up the passenger;

subsequent to initiation of transporting of the passenger for the ride-sharing trip with the passenger seated in the particular seat, reassigning the passenger to a differing seat from the plurality of seats in the autonomous vehicle;

outputting, to the passenger, a differing indication of the differing seat to which the passenger is reassigned; and detecting the physical condition of the passenger subsequent to the initiation of the transporting of the passenger for the ride-sharing trip with the passenger seated in the particular seat, wherein the physical condition of the passenger is a physical disability of the passenger, wherein reassigning of the passenger from the particular seat to the differing seat is selectively enabled when the physical condition of the passenger is not detected, and wherein the reassigning of the passenger from the particular seat to the differing seat is selectively disabled when the physical condition of the passenger is detected.

* * * * *